United States Patent
She et al.

(10) Patent No.: US 9,748,857 B2
(45) Date of Patent: Aug. 29, 2017

(54) METHOD AND SYSTEM FOR A GAS TUBE-BASED CURRENT SOURCE HIGH VOLTAGE DIRECT CURRENT TRANSMISSION SYSTEM

(71) Applicant: General Electric Company, Schenectady, NY (US)

(72) Inventors: Xu She, Clifton Park, NY (US); Rahul Shantilal Chokhawala, Niskayuna, NY (US); James William Bray, Niskayuna, NY (US); Timothy John Sommerer, Ballston Spa, NY (US); Rui Zhou, Niskayuna, NY (US); Di Zhang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 93 days.

(21) Appl. No.: 14/824,657

(22) Filed: Aug. 12, 2015

(65) Prior Publication Data
US 2017/0047857 A1 Feb. 16, 2017

(51) Int. Cl.
*H02M 5/458* (2006.01)
*H02M 7/19* (2006.01)
(Continued)

(52) U.S. Cl.
CPC ............... *H02M 5/458* (2013.01); *H02J 3/36* (2013.01); *H02M 5/456* (2013.01); *H02M 7/19* (2013.01); *H02M 7/213* (2013.01); *H02M 7/219* (2013.01)

(58) Field of Classification Search
CPC ......... H02M 2007/4835; H02M 5/458; H02M 7/217; H02M 7/49; H02M 1/0061; H02M 7/046; H02M 7/445; H02J 3/36
See application file for complete search history.

(56) References Cited

U.S. PATENT DOCUMENTS 2,697,206 A 12/1954 Malter
2,786,967 A 3/1957 Kuenning
(Continued)

FOREIGN PATENT DOCUMENTS

CN 101745178 B 1/2013
CN 103050966 B 3/2014
(Continued)

OTHER PUBLICATIONS

U.S. Appl. No. 14/076,687, filed Nov. 11, 2013, entitled System and Methods of Generating a Computer Model of a Component.
(Continued)

*Primary Examiner* — Fred E Finch, III
*Assistant Examiner* — Demetries A Gibson
(74) *Attorney, Agent, or Firm* — Nitin N. Joshi (57) ABSTRACT

A high-voltage direct-current (HVDC) transmission system includes an alternating current (AC) electrical source and a power converter channel that includes an AC-DC converter electrically coupled to the electrical source and a DC-AC inverter electrically coupled to the AC-DC converter. The AC-DC converter and the DC-AC inverter each include a plurality of legs that includes at least one switching device. The power converter channel further includes a commutating circuit communicatively coupled to one or more switching devices. The commutating circuit is configured to "switch on" one of the switching devices during a first portion of a cycle of the H-bridge switching circuits and "switch off" the switching device during a second portion of the cycle of the first and second H-bridge switching circuits.

19 Claims, 3 Drawing Sheets

(51) Int. Cl.
*H02J 3/36* (2006.01)
*H02M 7/213* (2006.01)
*H02M 7/219* (2006.01)
*H02M 5/456* (2006.01)

(56) References Cited

U.S. PATENT DOCUMENTS

| | | | |
|---|---|---|---|
| 4,761,600 A * | 8/1988 | D'Atre | H02P 23/06 318/758 |
| 4,950,962 A | 8/1990 | Birnbach et al. | |
| 5,657,213 A * | 8/1997 | Bjorklund | H02J 3/1807 363/35 |
| 5,751,563 A * | 5/1998 | Bjorklund | H02J 3/36 363/35 |
| 6,141,226 A * | 10/2000 | Halvarsson | H02J 3/36 363/35 |
| 6,252,787 B1 | 6/2001 | Zappacosta, II | |
| 8,450,961 B2 * | 5/2013 | Sakakibara | H02M 1/4216 318/479 |
| 8,796,552 B2 | 8/2014 | Faulkner et al. | |
| 8,937,798 B2 | 1/2015 | Hosini et al. | |
| 9,099,936 B2 * | 8/2015 | Gupta | H02M 5/44 |
| 9,312,803 B2 * | 4/2016 | Allaert | H02P 27/06 |
| 9,444,360 B2 * | 9/2016 | Sakakibara | H02M 5/4585 |
| 9,461,555 B2 * | 10/2016 | Kumar | H02J 3/36 |
| 2010/0046255 A1 * | 2/2010 | Paajarvi | H02J 3/36 363/35 |
| 2014/0328093 A1 | 11/2014 | Zhang et al. | |
| 2015/0098259 A1 | 4/2015 | Michael et al. | |
| 2015/0155716 A1 * | 6/2015 | Balda | H02M 5/4585 363/35 |
| 2015/0333654 A1 * | 11/2015 | Song | H02M 7/49 363/89 |

FOREIGN PATENT DOCUMENTS

| | | |
|---|---|---|
| WO | 2012146297 A1 | 11/2012 |
| WO | 2012163841 A1 | 12/2012 |
| WO | 2013185815 A1 | 12/2013 |
| WO | 2014079749 A1 | 5/2014 |
| WO | 2014079750 A1 | 5/2014 |
| WO | 2014142974 A1 | 9/2014 |
| WO | 2014143100 A1 | 9/2014 |

OTHER PUBLICATIONS

Elserougi, Ahmed, et al. "HVDC Shunt Tap Based on Series-input Parallel-output DC-AC Multi-module VSCs with DC Voltages Balancing." (2014): 5-1.

"Real-Time Simulation of a Simulink/Simpowersystems Model of a Bipolar HVDC System Using ARTEMiS and RT-Lab", OPAL.RT Technologies, 2014.

Lutz Michael A. et al., "The Gamitron—A High Power Crossed-Field Switch Tube for HVDC Interruption", Plasma Science, IEEE Transactions on, vol. 2, Issue: 1, pp. 11-24, Mar. 1974.

Ingram S. B., "Cold-Cathode Gas-Filled Tubes As Circuit Elements", Electrical Engineering, vol. 58, Issue: 7,pp. 342-346, Jul. 1939.

Bahrman et al., "The ABCs of HVDC Transmission Technologies", IEEE power and Energy Magazine , IEEE, Piscataway, NJ, US, vol. No. 04, Issue No. 02, pp. 32-44, ISSN:1540-7977, Mar./Apr. 2007.

International Search Report and Written Opinion issued in connection with corresponding Application No. PCT/US2016/040237 on Nov. 9, 2016.

* cited by examiner

METHOD AND SYSTEM FOR A GAS TUBE-BASED CURRENT SOURCE HIGH VOLTAGE DIRECT CURRENT TRANSMISSION SYSTEM

STATEMENT REGARDING FEDERALLY SPONSORED RESEARCH AND DEVELOPMENT

This invention was made with Government support under contract number DE-AR0000298 awarded by the Department of Energy (DOE). The Government may have certain rights in this invention.

BACKGROUND

This description relates to high voltage direct current (HVDC) transmission systems, and, more particularly, to HVDC converter systems and a method of operation thereof.

High voltage direct current (HVDC) electrical power transmission, in contrast with the prevalent alternating current (AC) systems, exhibits benefits of cost and loss reduction in the long-distance transmission of electrical power. Throughout the world, electrical power is traditionally distributed with high voltage AC. High voltage is used for transmission because the loss of energy during transmission is proportional to the amount of electrical current squared ($I^2R$ losses). Thus, raising the voltage instead of raising the current allows more energy to be transmitted without significantly increasing the transmission losses. AC was selected for power transmission in the early days of electrification instead of direct current (DC) because it was much easier to transform between different voltage levels with alternating current than with direct current.

Although alternating current is used for most electrical energy transmission, alternating current has its own set of problems. Alternating current generally requires more conductors to carry a similar amount of electrical power than direct current. Alternating current can suffer a 'skin effect,' where much of the power transmission is carried by the outer surface of the conductor instead of being uniformly carried by the conductor, thus resulting in increased transmission losses as compared to direct current transmission. Furthermore, it can be very difficult to transmit electrical power with alternating current with undersea or underground cables due to the associated increased cable capacitance. Thus, for many long-distance electrical energy transmission tasks, high-voltage direct current is used instead of alternating current. Direct current transmission is also able to connect asynchronous power grids through a DC hub, which permits a controlled flow of energy while also functionally isolating the independent AC frequencies of each side and thereby preventing fault propagation. For example, the Eastern Interconnection and Western Interconnection are the two major alternating-current (AC) electrical grids in North America. The Texas interconnection is one of several minor interconnections with respect to the Eastern and Western Interconnection. The Eastern, the Western and the Texas Interconnections may be connected via HVDC interconnection links. Geographically overlapping but electrically isolated asynchronous grids can be connected for the same purpose as above using "Back-to-Back" converters configuration requiring no additional transmission lines. Back-to-Back HVDC system can be seen as a specific case of HVDC transmission system.

HVDC transmission lines can also carry electrical energy over long distances with transmission losses significantly less than alternating current transmission losses. For example, high-voltage direct current transmission line losses are typically 30 to 40% lower than alternating current transmission line losses at the same voltage levels. Alternating current transmission lines are limited by their peak voltage levels but do not transmit much power at those peak levels, whereas direct current can transmit full power at the peak voltage level. Furthermore, because direct current does not involve multiple phases nor suffers from the skin effect, direct current transmission lines can have fewer conductor lines and smaller conductor lines. As a result dimension and costs of the transmission towers is reduced along with issues associated with the right-of-way. Additionally, reactive power issues that affect alternating current transmission, do not affect direct current transmission.

However, HVDC transmission is generally avoided unless the power is being transmitted by an undersea cable or over a very long distance. High-voltage direct current is generally avoided because the conversion equipment is very complex and expensive. Thus, even though direct current provides significant efficiency advantages for electrical energy transmission, direct current is rarely used for electricity transmission. At least some known HVDC transmission systems include conventional conversion equipment that typically includes a multi-phase AC-to-DC converter, a long distance DC power conductor, such as, but not limited to an electrical cable for transmission of the electrical power, and a multi-phase DC-to-AC inverter on the load end of the system. Switching valves in the multi-phase AC-to-DC converter and multi-phase DC-to-AC inverter are typically silicon-based and subject to relatively low voltage and current ratings. To increase the ratings of the system to a level useful for power transmission systems, many such valves are coupled in electrical series and/or electrical parallel. Although such connections increase the ratings of the multi-phase AC-to-DC converter and the multi-phase DC-to-AC inverter, such connections also increase the complexity of commutation of the valves and the space requirements of the components that make up the conversion system.

The state-of-the-art of HVDC converter technology has evolved from the line commuted converter (LCC) HVDC using thyristors, to voltage source converter (VSC) HVDC technology, and most recently to the modular multilevel converter (MMC) HVDC technology and their hybrid combinations. The LCC HVDC is a current source system, in which the thyristor is used. Because the thyristor cannot be forced to turn off, this kind of system relies on the grid for commutation. Therefore, it consumes a large amount of reactive power compensation as well as requires a strong grid environment. In addition, thyristors have a relatively low blocking voltage capability. For example, HVDC thyristor power semiconductors are rated for approximately eight kV.

BRIEF DESCRIPTION

In one aspect, a high-voltage direct-current (HVDC) transmission system includes an alternating current (AC) electrical source and a power converter channel. The power converter channel includes an AC-DC converter including a first H-bridge switching circuit electrically coupled to the electrical source. The first H-bridge switching circuit includes a plurality of legs electrically coupled in series parallel with respect to each other. Each leg includes at least one switching device. The power converter channel also includes a DC-AC inverter including a second H-bridge switching circuit electrically coupled to the AC-DC converter. The second H-bridge switching circuit includes a plurality of legs electrically coupled in series parallel with respect to each other. Each leg includes at least one switching device. The power converter channel further includes a commutating circuit communicatively coupled to one or more switching devices of at least one of the first and second H-bridge switching circuits. The commutating circuit configured to "switch on" a respective one of the one or more switching devices during a first portion of an operational cycle of at least one of the first and second H-bridge switching circuits and "switch off" the respective one of the one or more switching devices during a second portion of the operational cycle of the at least one of the first and second H-bridge switching circuits.

In another aspect, a method of transmitting electrical power using direct current (DC) transmission includes receiving alternating current (AC) electrical power and transferring current from a first switching device of a plurality of converter switching devices to a second switching device of the plurality of converter switching devices by sequentially turning on and turning off the first and the second switching device at selectable times. The method also includes generating a direct current (DC) flow of electrical power using the transferred current, and generating an alternating current using a plurality of inverter switching devices by sequentially turning on and turning off the inverter switching devices at selectable times.

In yet another aspect, a power converter channel includes an AC-DC converter including a first H-bridge switching circuit electrically coupled to the electrical source. The first H-bridge switching circuit includes a plurality of legs electrically coupled in series parallel with respect to each other. Each leg includes at least one switching device. The power converter channel also includes a DC-AC inverter including a second H-bridge switching circuit electrically coupled to the AC-DC converter. The second H-bridge switching circuit includes a plurality of legs electrically coupled in series parallel with respect to each other. Each leg includes at least one switching device. The power convert channel further includes a commutating circuit communicatively coupled to one or more switching devices of at least one of the first and second H-bridge switching circuits. The commutating circuit is configured to "switch on" a respective one of the one or more switching devices during a first portion of an operational cycle of at least one of the first and second H-bridge switching circuits and "switch off" the respective one of the one or more switching devices during a second portion of the operational cycle of the at least one of the first and second H-bridge switching circuits.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "black start" refers to providing electric power to at least one power generation facility in a geographically-isolated location from a source external to the power generation facility. A black start condition is considered to exist when there are no electric power generators in service in the power generation facility and there are no other sources of electric power in the geographically-isolated power generation facility to facilitate a restart of at least one electric power generator therein. Black start can be also seen as an extreme example of "weak-grid" whereby so called "Effective Short Circuit Ratio" or ESCR is low enough requiring additional equipment to provide voltage support in facilitating starting up of the HVDC converter.

The following detailed description illustrates embodiments of the disclosure by way of example and not by way of limitation. It is contemplated that the disclosure has general application to analytical and methodical embodiments of transmitting electrical power over long distances in industrial, commercial, and residential applications.

Embodiments of the present application describe a HVDC power transmission system architecture that is based on gas tube switches for the converter and inverter valves. Gas tube switches with, for example, a long-life liquid metal cathode exhibits attractive features. One such feature includes a single switching device operating at several hundred kilovolts and several hundred Amps. Another feature is a low switching loss that enables several hundred Hertz frequency operation with a relatively small filter size. Yet another feature includes a fully controllable turn-on and turn-off to enable both current source and voltage source operation. Still another feature includes bidirectional voltage and current blocking.

Due to the turn on and turn off capability of the gas tube switch as well as bidirectional current blocking capability, a current source rectifier topology is adopted into a HVDC system. Such a topology was not previously possible. The described HVDC converter system does not rely on the grid for commutation and can actively control the gas tube for voltage/power regulation. This capability is different than a thyristor-based HVDC converter system, because the thyristor is a line commuted device. Being able to positively control the turn-on and turn-off of the gas tube switches reduces the need for huge capacitor banks for reactive power compensation. Furthermore, the gas tube switch-based HVDC transmission system has an inherent black startup capability, therefore eliminating or reducing a need for a synchronous condenser.

Figure 1:
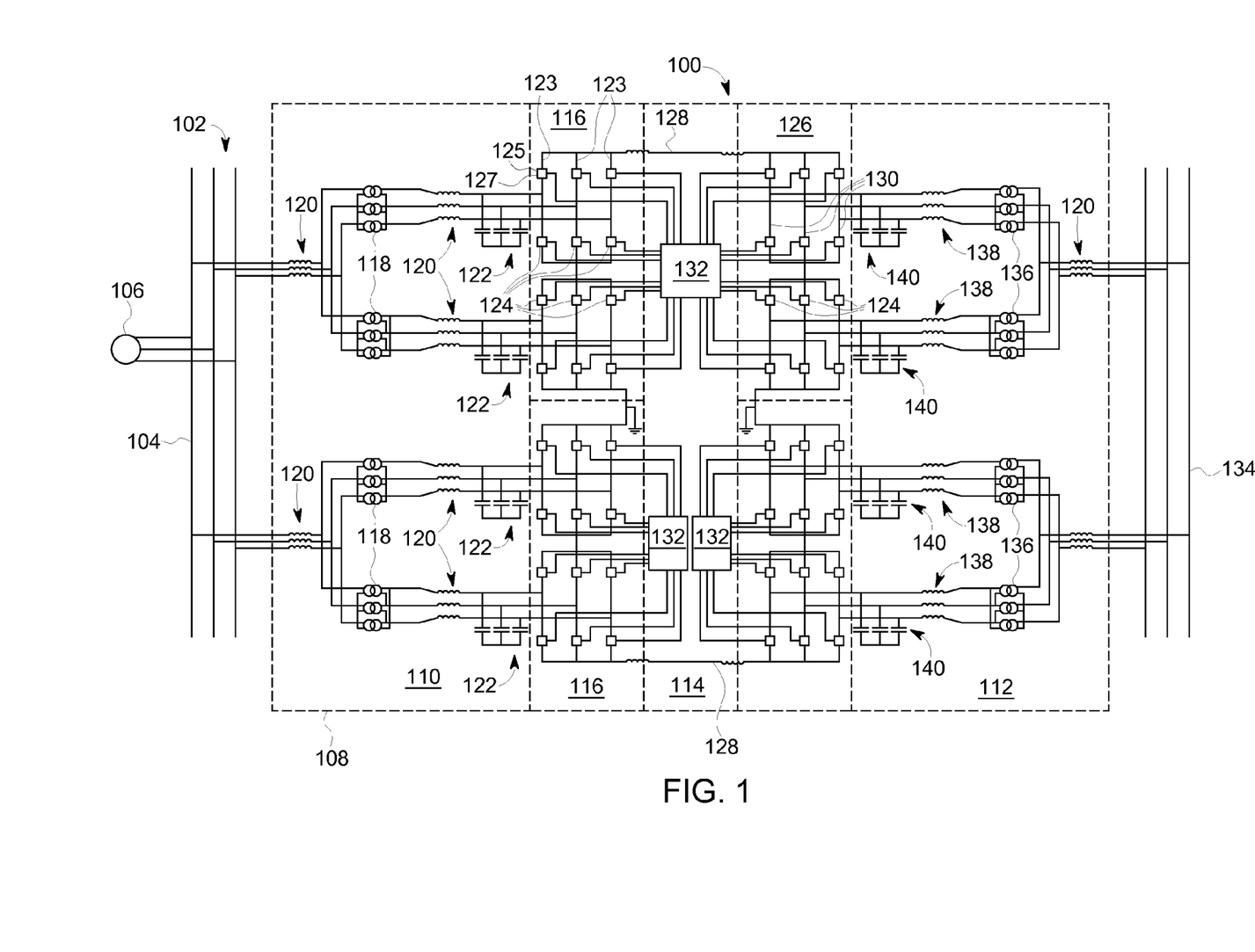
FIG. 1 is a schematic block diagram of an exemplary high voltage direct current (HVDC) transmission system.

FIG. 1 is a schematic block diagram of a high voltage direct current (HVDC) transmission system 100. In the exemplary embodiment, a configuration of HVDC transmission system 100 is of a current source converter (CSC) HVDC transmission system based on a gas tube switch valve assembly.

HVDC transmission system 100 includes an alternating current (AC) electrical source 102, which, in various embodiments, includes an AC bus 104 electrically coupled to a generator 106. HVDC transmission system 100 also includes a power converter channel 108 that includes an AC-DC converter 110, a DC-AC inverter 112, and one or more commutating circuits 114.

AC-DC converter 110 includes one or more first H-bridge switching circuits 116 electrically coupled to electrical source 102. In various embodiments, H-bridge switching circuits 116 are electrically coupled to electrical source 102 through one or more power conditioning components including for example, step-up transformers 118 configured to increase a voltage of the power from electrical source 102 to a level suitable for transmission. Power conditioning components also include line inductors 120 and capacitors 122.

H-bridge switching circuits 116 include a plurality of legs 123 electrically coupled in series and/or parallel with respect to each other. Each leg 123 includes at least one switching device 124. Capacitors 122 provide a path for current flow when the at least one switching device 124 is turned-off. In the exemplary embodiment, at least one switching device 124 is a gas tube switch including a chamber 125 enclosing an ionizable gas 127 and is configured to generate a plasma of ionized gas 127 to facilitate controlling current flow through switching device 124. Because switching device 124 is formed of a gas tube switch, switching device 124 is positively switched on and switched off to provide positive commutation of AC-DC converter 110. The positive commutation of gas tube switches is opposed to, for example, thyristors, which are typically used in power converters and power inverters. Thyristors are line commutated, meaning the thyristor is turned on by a control signal, but is turned off only when reverse-biased by a line voltage of electrical source 102. In one embodiment, gas tube switch type switching device 124 is rated for greater than approximately 100 kilovolts (kV). In another embodiment, gas tube switch type switching device 124 is rated for greater than approximately 300 kV. More than one switching device 124 is coupled in electrical series in each leg 123 to increase a voltage capability of AC-DC converter 110 and/or DC-AC inverter 112. Because the voltage rating of the gas tube switch is relatively greater than the voltage rating of other type switching devices, relatively fewer switching devices are needed for AC-DC converter 110 or DC-AC inverter 112 when using gas tube switches in contrast to a similarly rated AC-DC converter 110 or DC-AC inverter 112 using, for example, thyristors. Using relatively fewer devices permits less electrical loss, smaller space requirements, and less complex control algorithms for commutation of AC-DC converter 110 and DC-AC inverter 112.

DC-AC inverter 112 includes a second H-bridge switching circuit 126 electrically coupled to AC-DC converter 110 through at least one HVDC transmission conductor 128. Second H-bridge switching circuit 126 also includes a plurality of legs 130 electrically coupled in series parallel with respect to each other. Each leg of plurality of legs 130 includes at least one switching device 124. For a Back-to-Back HVDC converter system, transmission conductor 128 is replaced by bus system connecting the two co-located converters.

A commutating circuit 132 is communicatively coupled to one or more switching devices 124 of at least one of first H-bridge switching circuit 116 and second H-bridge switching circuit 126. Commutating circuit 132 is configured to "switch on" a respective one of one or more switching devices 124 during a first portion of an operational cycle of at least one of first H-bridge switching circuit 116 and second H-bridge switching circuit 126. Commutating circuit 132 is also configured to "switch off" the respective one of one or more switching devices 124 during a second portion of the operational cycle of at least one of first H-bridge switching circuit 116 and second H-bridge switching circuit 126. In various embodiments, commutating circuit 132 is embodied in a single circuit communicatively coupled to first H-bridge switching circuit 116 and second H-bridge switching circuit 126. In other embodiments, commutating circuit 132 is embodied in a circuit communicatively coupled to a respective one of each H-bridge switching circuit included in HVDC transmission system 100.

In various embodiments, commutating circuit 132 includes a processing device including at least one processor (not shown) communicatively coupled to at least one memory device. In such an embodiment, the at least one memory device includes instructions that when executed by the at least one processor, cause commutating circuit 132 to perform the steps described herein.

A load bus 134 is electrically coupled to second H-bridge switching circuit 126 through one or more power conditioning components including for example, step-down transformers 136, which are configured to decrease a voltage of the power from second H-bridge switching circuit 126 to a level suitable for distribution. The one or more power conditioning components also include line inductors 138 and capacitors 140.

Benefits of a power factor controlled gas tube switch CSC (utilizing turn-off capability of the gas tube-based switching device) in contrast to a thyristor-based LCC-HVDC system includes a reduced footprint of an AC switchyard, no additional reactive power required for a weak grid, no tap change for a converter transformer is required, and a black start capability.

A thyristor-based LCC-HVDC system has fairly large AC switchyard with air insulated switchgear, AC harmonic filters, high frequency filters and reactive power compensation equipment. A gas tube switch CSC-HVDC system with power factor control requires no reactive power compensation. With selective harmonic elimination, the AC harmonic filter requirement is also greatly reduced. Therefore, a gas tube switch CSC-HVDC will have a relatively smaller AC switchyard.

A thyristor-based LCC-HVDC system is a reactive power load due to its firing and overlap angle. The converter current is lagging the AC voltage. A weak grid can provide limited reactive power to the LCC-HVDC converter so that additional reactive power source is needed. For a typical weak grid LCC-HVDC installation, the cost of companion synchronized condenser for providing reactive power could be cost-prohibitive. A gas tube switch CSC-HVDC converter on the other hand is a reactive power source because its power factor can be controlled. In this case, no additional reactive power compensator is needed for a weak grid.

In a thyristor-based LCC-HVDC system, the thyristor valve cost is proportional to the rated voltage of the valve. For typical LCC installation, the converter transformer is equipped with taps to regulate the output voltage when there is a slow variation on primary AC bus. In this way, the thyristor valve doesn't need to carry additional headroom for voltage withstand, thus it is more economical. For a gas tube switch, the added cost to block additional voltage can be lower than the tap changer in the converter transformer. Hence, a no tap change converter transformer can be used for the gas tube switch CSC-HVDC system, which will greatly increase the maintenance interval of the transformer and improve the availability of the HVDC system.

Thyristors can only be turned on and can't be turned off. It requires an external voltage source to commutate from an "on" to "off" condition. Therefore, a thyristor-based LCC-HVDC system alone can't provide a black start capability. To provide black start, back-up power supply and VAR compensators are needed for the LCC-HVDC system. The gas tube switch can be turned "on" and "off." With this self-commutation ability, a gas tube switch CSC-HVDC system can provide a black start capability without an external power supply and VAR compensator.

Figure 2:
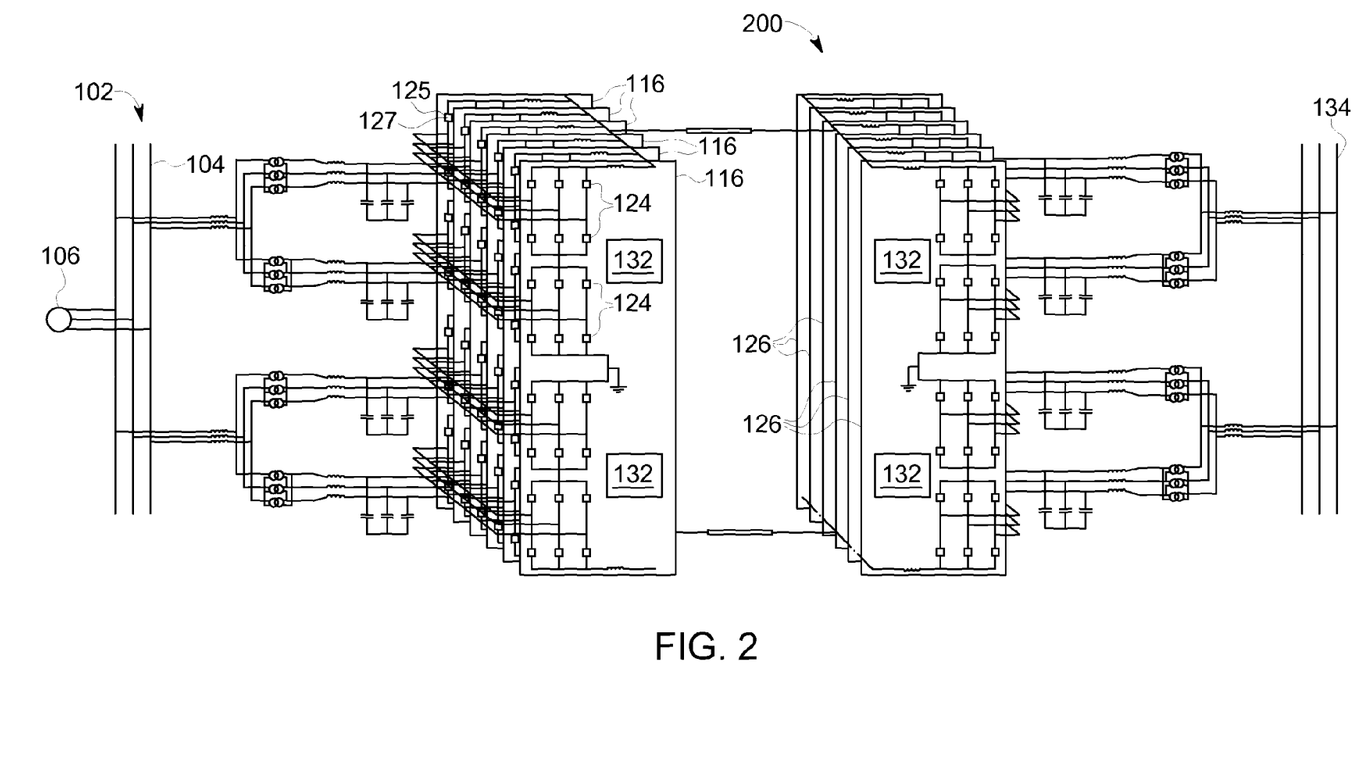
FIG. 2 is a schematic block diagram of an alternative HVDC transmission system with an increased voltage/current rating.

FIG. 2 is a schematic block diagram of a high voltage direct current (HVDC) transmission system 200 with increased voltage/current rating. In the exemplary embodiment, a current rating of HVDC transmission system 200 is increased for the very high power transmission using a plurality of H-bridge switching circuits 116 or 126 coupled in electrical parallel. A number of paralleled gas tube switches 124 or the number of paralleled H-bridge switching circuits 116 or 126 can be increased in each H-bridge switching circuit 116 or 126 for a higher current operation. In the exemplary embodiment, the number of H-bridge switching circuits 116 or 126 coupled in electrical parallel is increased to provide larger current carrying capability and potentially increased reliability though installed spare H-bridge switching circuits 116 or 126 that may be turned on and off on command from commutating circuit 132 or other control circuit. Additionally, providing a plurality of H-bridge switching circuits 116 or 126 coupled in parallel permits a modular design where each H-bridge switching circuits 116 or 126 may be swapped easily for a failed H-bridge switching circuit 116 or 126.

Figure 3:
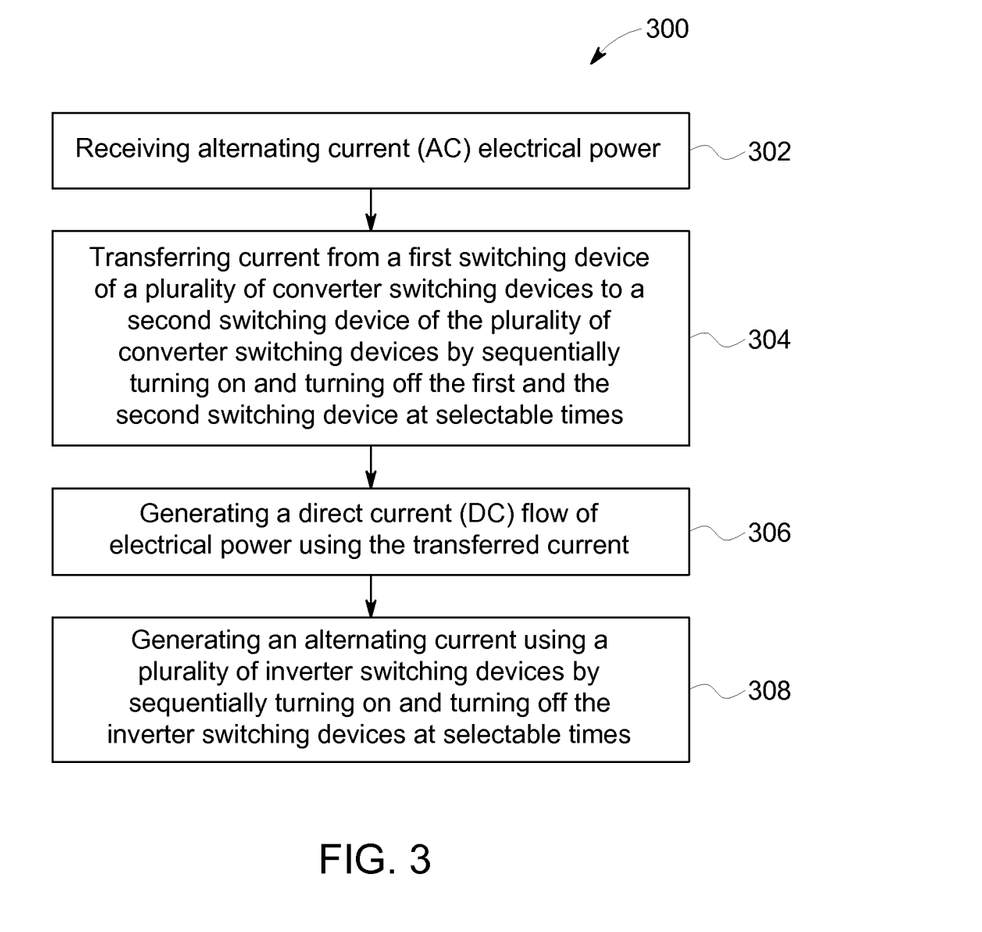
FIG. 3 is a flow diagram of an exemplary method of transmitting electrical power using the HVDC transmission systems shown in FIGS. 1 and 2.

FIG. 3 is a flow diagram of a method 300 of transmitting electrical power using direct current (DC) transmission. In the exemplary embodiment, method 300 includes receiving 302 alternating current (AC) electrical power, transferring 304 current from a first switching device of a plurality of converter switching devices to a second switching device of the plurality of converter switching devices by sequentially turning on and turning off the first and the second switching device at selectable times, generating 306 a direct current (DC) flow of electrical power using the transferred current, generating 308 an alternating current using a plurality of inverter switching devices by sequentially turning on and turning off the inverter switching devices at selectable times, and supplying 310 a load with the generated alternating current.

The above-described HVDC transmission systems provide a cost-effective method for transmitting HVDC power. The embodiments described herein facilitate transmitting HVDC power between an AC generating facility and an AC load grid, both remote from each other. The AC generating facility may be located many tens or hundreds of miles apart from the AC load grid and may even be located more than one thousand miles from the AC load grid. Specifically, the devices, systems, and methods described herein also facilitate enabling black start of a remote AC facility, e.g., an off-shore wind farm. Also, the devices, systems, and methods described herein facilitate decreasing reactive power requirements of associated converter systems while also providing for supplemental reactive power transmission features. Further, the devices, systems, and methods described herein facilitate significantly decreasing, and potentially eliminating, large and expensive switching AC filter systems, capacitor systems, and reactive power compensation devices, thereby facilitating decreasing a physical footprint of the associated system. In a Back-to-Back configuration, the above described HVDC system facilitates interconnection between two adjacent but asynchronous grids, thereby increasing both availability and reliability of electrical power.

An exemplary technical effect of the methods, systems, and apparatus described herein includes at least one of: (a) enabling black start of a remote AC electric power generation facility, e.g., an off-shore wind farm; (b) decreasing reactive power requirements of associated converter systems; (c) providing for supplemental reactive power transmission features; (d) significantly decreasing, and potentially eliminating, large and expensive switching AC filter systems, capacitor systems, and reactive power compensation devices, thereby decreasing a physical footprint of the associated HVDC transmission system.

Exemplary embodiments of HVDC transmission systems for coupling power generation facilities and a load grid, and methods for operating the same, are described above in detail. The HVDC transmission systems, HVDC converter systems, and methods of operating such systems are not limited to the specific embodiments described herein, but rather, components of systems and/or steps of the methods may be utilized independently and separately from other components and/or steps described herein. For example, the methods may also be used in combination with other systems requiring HVDC transmission and methods, and are not limited to practice with only the HVDC transmission systems, HVDC converter systems, and methods as described herein. Rather, the exemplary embodiment can be implemented and utilized in connection with many other high power conversion applications, for example, without limitation, multi-megawatt sized drive applications.

Although specific features of various embodiments of the invention may be shown in some drawings and not in others, this is for convenience only. In accordance with the principles of the invention, any feature of a drawing may be referenced and/or claimed in combination with any feature of any other drawing.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely exemplary or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving alternating current (AC) electrical power, (b) transferring current from a first switching device of a plurality of converter switching devices to a second switching device of the plurality of converter switching devices by sequentially turning on and turning off the first and the second switching device at selectable times, (c) generating a direct current (DC) flow of electrical power using the transferred current, (d) generating an alternating current using a plurality of inverter switching devices by sequentially turning on and turning off the inverter switching devices at selectable times, and (e) supplying a load with the generated alternating current. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of transmitting electrical power using direct current (DC) transmission provides a cost-effective and reliable means transmitting electrical power over long distances with relatively little losses. In the Back-to-Back configuration, the above described HVDC system facilitates interconnection between two adjacent but asynchronous grids, thereby increasing both availability and reliability of electrical power. More specifically, the methods and systems described herein facilitate converting AC electrical power using valves that are positively turned on and positively turned off. The valves are gas tube based power electronic switches as compared to, for example, thyristor based switches. In addition, the above-described methods and systems facilitate reducing a complexity of the converter commutation circuit because of the lesser numbers of gas tube switches needed than a thyristor-based system with a similar rating capability. As a result, the methods and systems described herein facilitate reducing cost while improving the capability of the HVDC transmission system in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A current source converter-based high-voltage direct-current (HVDC) transmission system comprising:
   an alternating current (AC) electrical source; and
   a current source converter (CSC)-based power converter channel comprising:
      an AC-DC converter comprising a first H-bridge switching circuit electrically coupled to the electrical source, said first H-bridge switching circuit comprising a plurality of first legs electrically coupled in series parallel with respect to each other, each first leg of the plurality of first legs comprising at least one first switching device;
      a DC-AC inverter comprising a second H-bridge switching circuit electrically coupled to said AC-DC converter, said second H-bridge switching circuit comprising a plurality of second legs electrically coupled in series parallel with respect to each other, each second leg of said plurality of second legs comprising at least one second switching device; and
      a commutating circuit communicatively coupled to one or more first and second switching devices of at least one of said first and second H-bridge switching circuits, respectively, said commutating circuit configured to "switch on" a respective one of said one or more first and second switching devices during a first portion of an operational cycle of at least one of said first and second H-bridge switching circuits, respectively, and said commutating circuit further configured to "switch off" said respective one of said one or more first and second switching devices during a second portion of the operational cycle of said at least one of said first and second H-bridge switching circuits respectively;
      wherein at least a portion of said switching devices comprise a plurality of gas tube switches; and
      wherein the commutating circuit is further configured to transfer current from a first gas tube switch of the plurality of gas tube switches to a second gas tube switch of the plurality of gas tube switches.

2. The HVDC transmission system of claim 1, wherein at least a portion of said switching devices is rated for greater than approximately 100 kilovolts (kV).

3. The HVDC transmission system of claim 2, wherein at least a portion of said switching devices is rated for greater than approximately 300 kilovolts (kV).

4. The HVDC transmission system of claim 1, wherein each said switching device comprises a chamber enclosing an ionizable gas.

5. The HVDC transmission system of claim 1, wherein said HVDC transmission system comprises a plurality of power converter channels coupled in electrical parallel.

6. The HVDC transmission system of claim 1, wherein at least one of said first and said second H-bridge switching circuits comprises a plurality of switching devices coupled in electrical series.

7. The HVDC transmission system of claim 1, further comprising a load bus electrically coupled to said second H-bridge switching circuit.

8. The HVDC transmission system of claim 1, wherein said commutating circuit comprises a first commutating circuit communicatively coupled to one or more of the first switching devices of only said first H-bridge switching circuit and a second commutating circuit communicatively coupled to one or more second switching devices of only said second H-bridge switching circuit.

9. The HVDC transmission system of claim 1, wherein switching devices have bidirectional current blocking capability.

10. A method of transmitting electrical power using direct current (DC) transmission, said method comprising:
    receiving alternating current (AC) electrical power;
    transferring current from a first switching device of a plurality of converter switching devices to a second switching device of the plurality of converter switching devices by sequentially turning on and turning off the first and the second switching devices at selectable times;
    generating a direct current (DC) flow of electrical power using the transferred current; and
    generating an alternating current using a plurality of inverter switching devices by sequentially turning on and turning off the inverter switching devices at selectable times;
    wherein transferring current from a first switching device of a plurality of converter switching devices to a second switching device of the plurality of converter switching devices comprises transferring current from a first gas tube switch of a plurality of converter gas tube switches to a second gas tube switch of the plurality of converter gas tube switches.

11. The method of claim 10, wherein transferring current from said first switching device of a plurality of converter switching devices to a second switching device of the plurality of converter switching devices comprises commutating the converter switching devices using a commutating circuit communicatively coupled to each converter switching device of the plurality of converter switching devices.

12. The method of claim 10, wherein generating said alternating current using a plurality of inverter switching devices comprises controlling a reactive power output of the plurality of inverter switching devices by controlling a commutation of the plurality of inverter switching devices.

13. The method of claim 10 further comprising enabling black start of a remote AC electric power generation facility.

14. A power converter channel comprising:
    an AC-DC converter comprising a first H-bridge switching circuit electrically coupled to the electrical source, said first H-bridge switching circuit comprising a plurality of first legs electrically coupled in series parallel with respect to each other, each first leg of the plurality of first legs comprising at least one first switching device;

a DC-AC inverter comprising a second H-bridge switching circuit electrically coupled to said AC-DC converter, said second H-bridge switching circuit comprising a plurality of second legs electrically coupled in series parallel with respect to each other, each second leg of said plurality of second legs comprising at least one second switching device; and a commutating circuit communicatively coupled to one or more first and second switching devices of at least one of said first and second H-bridge switching circuits, respectively, said commutating circuit configured to "switch on" a respective one of said one or more first and second switching devices during a first portion of an operational cycle of at least one of said first and second H-bridge switching circuits, respectively, and said commutating circuit further configured to "switch off" said respective one of said one or more first and second switching devices during a second portion of the operational cycle of said at least one of said first and second H-bridge switching circuits respectively;

wherein at least a portion of said switching devices comprise a plurality of gas tube switches; and wherein the commutating circuit is further configured to transfer current from a first gas tube switch of the plurality of gas tube switches to a second gas tube switch of the plurality of gas tube switches.

15. The power converter channel of claim 14, wherein at least a portion of said switching devices is rated for greater than approximately 100 kilovolts (kV).

16. The power converter channel of claim 15, wherein at least a portion of said switching devices is rated for greater than approximately 300 kilovolts (kV).

17. The power converter channel of claim 14, wherein each said switching device comprises a chamber enclosing an ionizable gas.

18. The power converter channel of claim 14, wherein said HVDC transmission system comprises a plurality of power converter channels coupled in electrical parallel.

19. The power converter channel of claim 14, wherein at least one of said first and said second H-bridge switching circuits comprises a plurality of switching devices coupled in electrical series.

* * * * *